US012134974B2

(12) United States Patent
Chiu et al.

(10) Patent No.: US 12,134,974 B2
(45) Date of Patent: Nov. 5, 2024

(54) # CORE AIR LEAKAGE REDIRECTION STRUCTURES FOR AIRCRAFT ENGINES

(71) Applicant: General Electric Company, Schenectady, NY (US)

(72) Inventors: Ya-Tien Chiu, Niskayuna, NY (US); Giridhar Jothiprasad, Clifton Park, NY (US); David V. Parker, Middleton, MA (US); Michael Macrorie, Winchester, MA (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 17/880,832

(22) Filed: Aug. 4, 2022

(65) Prior Publication Data

US 2024/0044257 A1 Feb. 8, 2024

(51) Int. Cl.
*F01D 9/04* (2006.01)

(52) U.S. Cl.
CPC ...... *F01D 9/041* (2013.01); *F05D 2220/3216* (2013.01); *F05D 2230/237* (2013.01); *F05D 2240/12* (2013.01)

(58) Field of Classification Search
CPC ...... F04D 29/68; F04D 29/682; F04D 29/684; F04D 29/685; F01D 5/145
See application file for complete search history.

(56) References Cited

U.S. PATENT DOCUMENTS

| | | | | |
|---|---|---|---|---|
| 7,244,104 | B2 | 7/2007 | Girgis | |
| 7,665,964 | B2 | 2/2010 | Taylor | |
| 8,591,176 | B2 | 11/2013 | Guemmer | |
| 9,334,878 | B2 * | 5/2016 | Domercq | F04D 29/542 |
| 9,644,483 | B2 | 5/2017 | Subramaniyan | |
| 9,874,221 | B2 | 1/2018 | Dipietro, Jr. | |
| 10,472,978 | B2 | 11/2019 | Whurr | |
| 10,480,531 | B2 * | 11/2019 | Shibata | F04D 29/542 |
| 11,002,141 | B2 | 5/2021 | Lurie | |
| 11,078,801 | B2 | 8/2021 | Guegan | |
| 11,125,089 | B2 | 9/2021 | Bertini | |
| 2009/0317232 | A1 * | 12/2009 | Guemmer | F04D 29/684 415/115 |
| 2010/0322775 | A1 | 12/2010 | Norbert | |
| 2011/0158797 | A1 * | 6/2011 | Chiu | F01D 11/001 415/208.2 |
| 2014/0205441 | A1 * | 7/2014 | Lee | F01D 11/02 415/170.1 |

* cited by examiner

*Primary Examiner* — Thuyhang N Nguyen
(74) *Attorney, Agent, or Firm* — Fitch, Even, Tabin & Flannery LLP

(57) ABSTRACT

A stator structure including a plurality of stator blades and redirection structures including a first portion and a second portion, the first portion disposed on a front edge surface of a stator hub and a second portion disposed on a facing of the stator hub is provided. The stator hub includes the facing and the front edge surface, the facing being disposed generally perpendicular to the casing, and the front edge surface is disposed generally perpendicular to the facing. During operation of a turbine engine a core air flow moves along the longitudinal axis and past the plurality of stator blades, and a leakage air flow moves in a direction different to the core air flow, the redirection structures are effective to redirect the leakage air flow to merge into the core air flow.

19 Claims, 12 Drawing Sheets

CORE AIR LEAKAGE REDIRECTION STRUCTURES FOR AIRCRAFT ENGINES

TECHNICAL FIELD

These teachings relate generally to structures to redirect a leakage air flow and provide loading relief to stator blades.

BACKGROUND

Shrouded hubs and blades within a turbine engine may be used to increase the overall efficiency of the turbine engine and/or the compressor sections within the turbine engine. A leakage air flow different than a core air flow may be created in the shrouded hubs and blades as air flows through the turbine engine. The leakage air flow may cause losses in efficiency.

BRIEF DESCRIPTION OF THE DRAWINGS

Various needs are at least partially met through provision of the structures and turbine engines described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
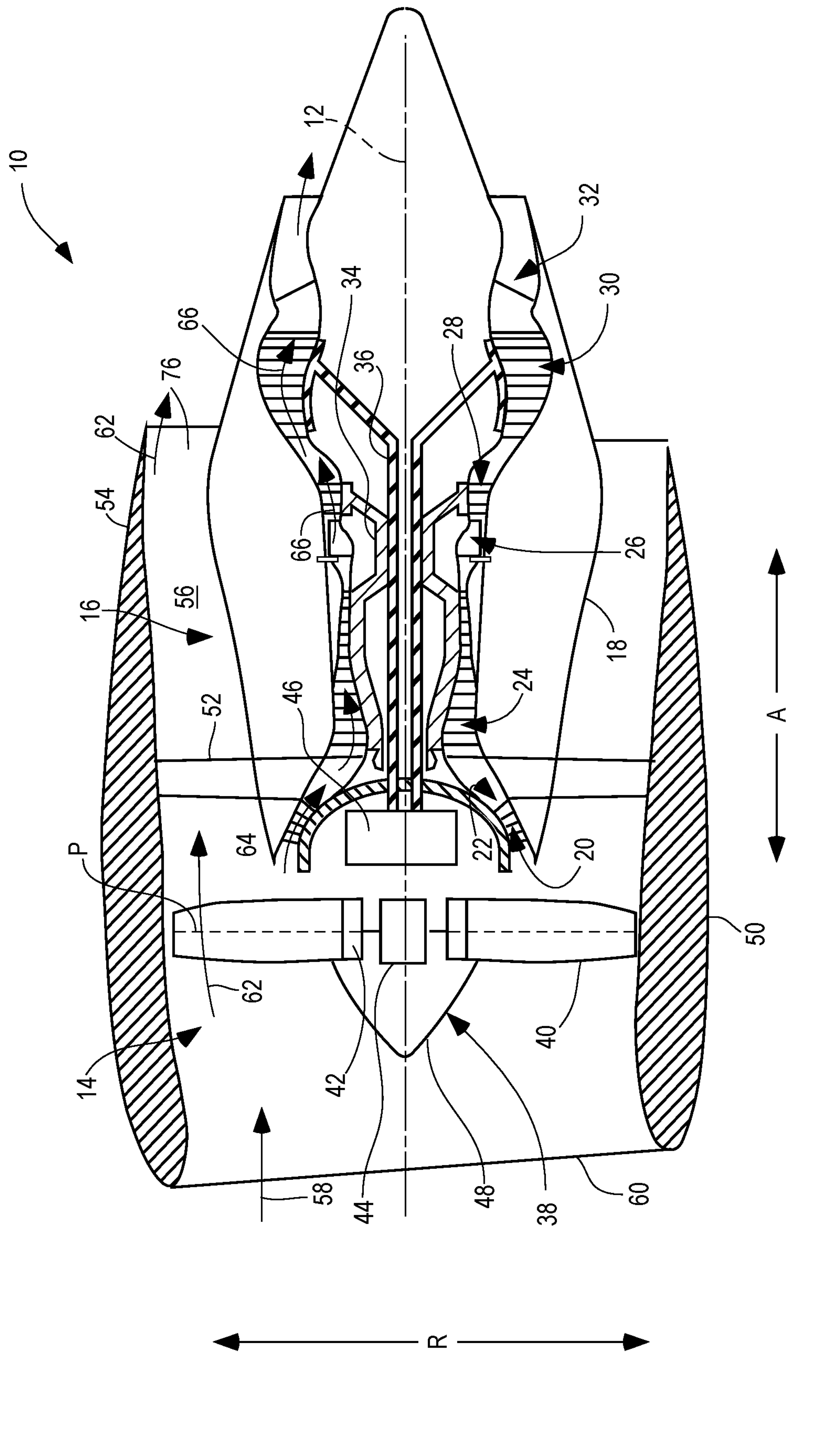
FIG. 1 comprises a cross-sectional view of a turbine engine for an aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/ or steps may be described or depicted in a particular order of occurrence while those skilled in the art will understand that such specificity with respect to sequence is not actually required.

DETAILED DESCRIPTION

The approaches presented herein provide for improved efficiency of compressor sections and loading relief of the associated stators and hubs of turbine engines. More specifically, the approaches described herein provide for redirection structures to be disposed onto stator hubs and blades to redirect a leakage air flow to merge with a core air flow as the core air flow passes through the compressor section of the turbine engine. Further, the redirection structures provide for loading relief of hubs and blades in the compressor section.

In some of these approaches, the redirection structures may be coupled to or formed with a stator hub and merge the leakage air flow with the core air flow. In aspects, the redirection structures may be brazed onto the stator hub. Further, the redirection structures may be a single continuous structure or may be a non-continuous structure. Additionally, the redirection structures may be disposed on more than one surfaces of the hub, such as a front edge surface and/or a facing of the hub.

The heights, lengths, thicknesses, and other associated sizes, distances, measurements, and/or specifications for various elements (e.g., the redirection structures) described herein may be uniform and the same across the entire structure. However, it will be appreciated that these parameters may also be different (e.g., the dimensions of one redirection structure may be different in one part of the engine than the dimensions of other redirection structures at other locations in the engine).

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description. It will be appreciated that the approaches provided herein are described in examples relating to redirection or guidance structures provided on or formed with hubs and blades to redirect, guide, and/or merge the leakage air flow with the core air flow, as well as aid in protecting leading edge incidence and loading capability from the leakage air flow, and additionally improve the local solidity near leading edge to counteract the leakage air flow induced incidence.

Referring now to the drawings, wherein identical numerals indicate the same elements throughout the figures, FIG. 1 is a cross-sectional view of a gas turbine engine. The gas turbine engine is a high-bypass turbofan jet engine, referred to herein as "turbine engine 10." The turbine engine 10 extends in an axial direction A (extending parallel to a longitudinal axis 12, or centerline, provided for reference) and a radial direction R. In general, the turbine engine 10 includes a fan section 14 and a core turbine engine 16 disposed downstream from the fan section 14.

The exemplary core turbine engine 16 depicted generally includes a substantially tubular outer casing 18 that defines an annular inlet 20. The tubular outer casing 18 encases, in serial flow relationship, a compressor section including a low pressure (LP) compressor section 22 and a high pressure (HP) compressor section 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor section 24. A low pressure (LP) spool 36 drivingly connects the LP turbine 30 to the LP compressor section 22.

The fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by low pressure spool 36 across a power gear box 46. The power gear box 46 includes a plurality of gears for stepping down the rotational speed of the LP spool 36 to a more efficient rotational fan speed.

Referring still to the exemplary embodiment of FIG. 1, the disk 42 is covered by rotatable front hub 48 aerodynamically contoured to promote an air flow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially spaced outlet guide vanes 52. Moreover, a downstream section 54 of the outer nacelle 50 may extend over an outer portion of the core turbine engine 16 to define a bypass air flow passage 56 therebetween.

During operation of the turbine engine 10, a volume of air 58 enters the turbine engine 10 through an associated inlet 60 of the outer nacelle 50 and/or fan section 14. As the volume of air 58 passes across the fan blades 40, a first portion 62 of the air 58 as indicated by arrow is directed or routed into the bypass air flow passage 56 and a second portion 64 of the air 58 as indicated by arrow is directed or routed into the LP compressor section 22. The volume of air 58, and in turn the first portion 62 and the second portion 64 include an associated velocity, including a magnitude and a direction therewith. The ratio between the first portion 62 of air 58 and the second portion 64 of air 58 is commonly known as a bypass ratio. The pressure of the second portion 64 of air 58 is then increased as it is routed through the HP compressor section 24 and into the combustion section 26, where it is mixed with fuel and burned to provide combustion gases 66. Subsequently, the combustion gases 66 are routed through the hot flow path, or hot section flow path, of the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass air flow passage 56 before it is exhausted from a fan nozzle exhaust section 76 of the turbine engine 10, also providing propulsive thrust.

It should be appreciated, however, that the exemplary turbine engine 10 depicted in FIG. 1 is by way of example only, and that in other exemplary embodiments, aspects of the present disclosure may additionally, or alternatively, be applied to any other suitable turbine engine. For example, in other exemplary embodiments, the turbine engine 10 may instead be any other suitable aeronautical turbine engine, such as a turbojet engine, turboshaft engine, turboprop engine, etc. Additionally, in still other exemplary embodiments, the exemplary turbine engine 10 may include or be operably connected to any other suitable accessory systems. Additionally, or alternatively, the exemplary turbine engine 10 may not include or be operably connected to one or more of the accessory systems discussed above.

The HP compressor section 24 and/or the LP compressor section 22 may include the redirection structures described in further detail herein. In aspects, these redirection structures redirect a leakage air flow, having a corresponding velocity, occurring in the compressor sections 22 and 24 back into the second portion 64 of the air 58 to continue through the turbine engine 10. The redirection structures are coupled to or formed with the stator hubs. The stator hubs are disposed within the compressor sections 22 and 24.

Referring now to FIGS. 2 and 3A to 3E, a cross section of a portion of a compressor section is described. It will be appreciated that, as discussed herein, the structures discussed may be utilized in the HP compressor section 24 shown in FIG. 1. While discussed herein with reference to the structures being utilized in the HP compressor section 24, it will be appreciated that the structures discussed herein may additionally, or alternatively, be utilized in the LP compressor section 22. As further discussed herein, reference is made to rotor blades **96*a* and 96*b*, as well as a stator blade 104, it will be appreciated that one stage of the compressor sections 22 and 24 includes one row of rotor blades and one row of stator blades, e.g., rotor blade 96*a* and stator blade 104 are one stage. The present disclosure is applicable to all stages of the compressor sections 22 and 24, and the stage including the rotor blade 96*a* and stator blade 104** is discussed by way of a non-limiting example.

The HP compressor section 24 is disposed within the casing 18. The casing 18 is centered about the longitudinal axis 12 and extends substantially parallel along the longitudinal axis 12. The HP compressor section 24 includes a rotor hub 95. The rotor hub 95 is centered about the longitudinal axis 12 and extends substantially parallel along the longitudinal axis 12. Rotor blades **96*a* and 96*b* are coupled to the rotor hub 95 and extend outward from the longitudinal axis 12 towards the casing 18. The HP compressor section 24 further includes stator blades 104 coupled to the casing 18. The stator blades 104 are further coupled to a stator hub 102 and extend inward from the casing towards the longitudinal axis 12. The stator hub 102 is centered about the longitudinal axis 12. The stator hub 102 may be a substantially circular or ringed structure disposed around the rotor hub 95, a cross-section of which is shown in FIGS. FIGS. 2 and 3A to 3**E.

The stator hub 102 may be a shrouded stator hub. The stator hub 102 may be disposed below a top surface of the rotor hub 95, e.g., where the rotor blade 96*a* extends from, creating a first axial gap 97 between the stator hub 102 and the rotor hub 95. A second axial gap 99 may be defined as the space between the rotor blade 96*a* and the stator blade 104. While various stator configurations may be used within turbine engines, the present disclosure relates to turbine engines configurations utilizing stator hubs.

Figure 2:
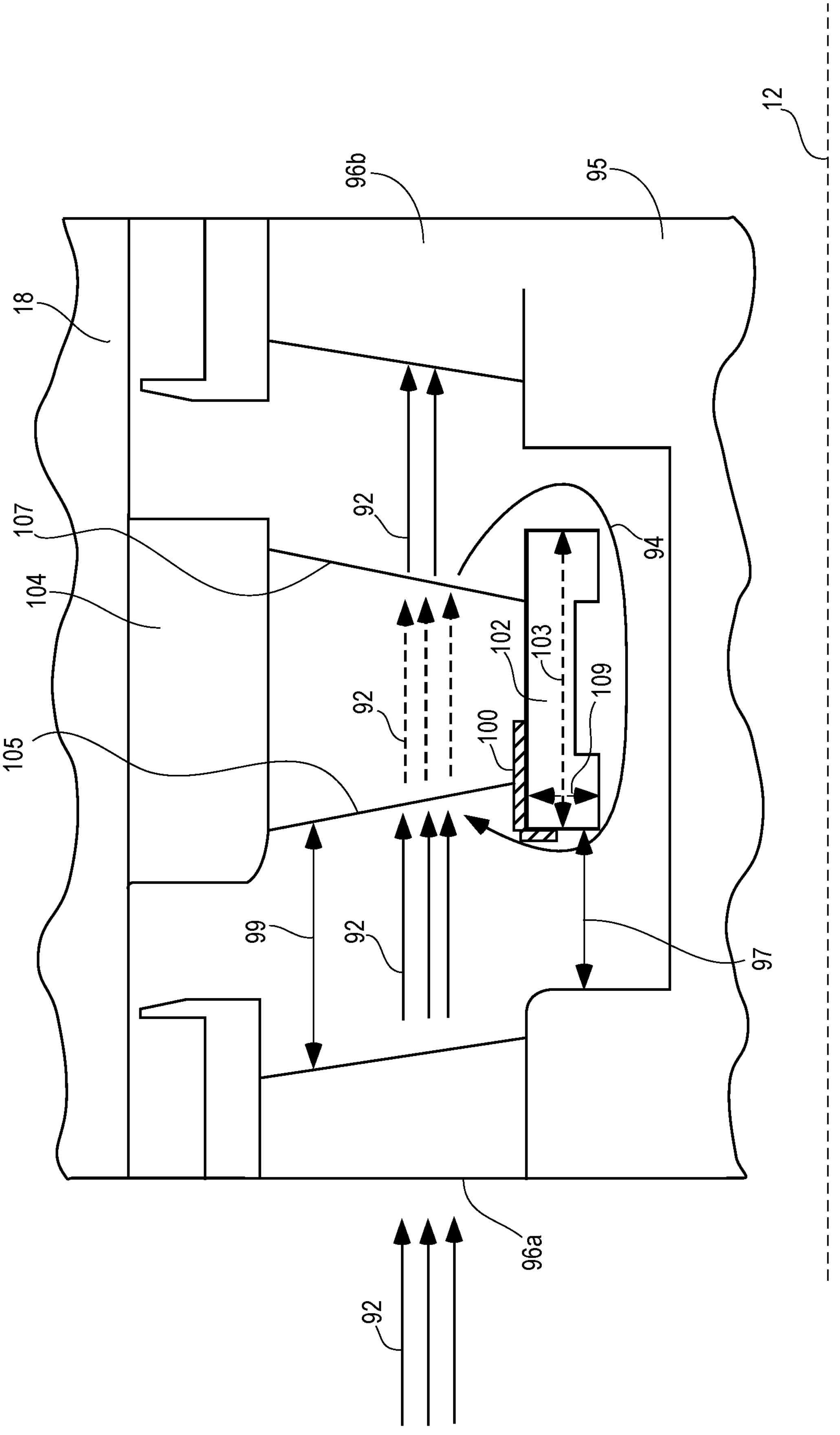
FIG. 2 comprises a side cross-sectional view of a portion of a compressor in accordance with various embodiments of these teachings.

Further describing the serial air flow relationship described above with reference to FIG. 1, the volume of air 58 may define a core air flow 92. The core air flow 92 has an associated velocity, e.g., a magnitude and direction. The core air flow 92, as depicted in FIG. 2, is substantially in the axial direction, e.g., generally parallel to the longitudinal axis 12. In these regards, and as known by one skilled in the art and illustrated in FIGS. 3B and 3C, the core air flow 92 includes an axial component 91 and a tangential component 93. The axial component 91 and the tangential component 93, similar to the core air flow 92, includes an associated velocity, e.g., a magnitude and a direction. The axial component 91 of the core air flow 92 may generally maintain the same direction, e.g., the axial direction substantially parallel to the longitudinal axis 12. The tangential component 93 of the core air flow 92 may generally maintain the same direction, e.g., the same direction as the rotation 89 of the rotor blades 96*a* and 96*b*. The magnitude, such as the speed of volume of air included in the axial component 91 and the tangential component 93 may vary as the core air flow 92 passes along the longitudinal axis 12.

By "air flow" and as used herein it is meant a volume of air that is moving or flowing through another volume or space, e.g., through an aircraft engine. As mentioned, the air flow may be described according to a velocity, including a magnitude and a direction. The magnitude and direction of the air flow may be represented as a vector, and this vector may be the summation of a vector representing air flow in the axial direction of the engine and another vector representing air flow in a tangential direction (e.g., the same direction as the rotation 89 of the rotor blades 96*a* and 96*b*) including the associated magnitudes therewith. By "magnitude" and as used herein it is meant the speed of air associated with each flow and/or component.

As the volume of air 58 enters the turbine engine 10, a portion, e.g., the core air flow 92, passes through the compressor sections 22 and 24, into the combustion section 26 and passes through the turbine sections 28 and 30. The core air flow 92 may pass through multiple stages of the associated sections. Specifically, as discussed herein, the core air flow 92 passes through multiple stages of the HP compressor section 24. One stage of a compressor section includes one row of rotor blades and one associated row of stator blades disposed adjacent to the rotor blades.

As the core air flow 92 passes through the compressor sections, the core air flow 92 passes about and around the rotor blade 96*a* and the rotor hub 95, traveling parallel or substantially parallel to the longitudinal axis 12, as the rotor blades 96*a* and 96*b* and the rotor hub 95 rotate about the longitudinal axis 12. The core air flow 92 further passes about and around the stator blades 104 and the stator hub 102, as shown by the dashed arrows in FIG. 2, the stator blades 104 and the stator hub 102 remain stationary about the longitudinal axis 12. The core air flow 92 continues passing by and around the rotor blade 96*b* as the rotor blades 96*a* and 96*b* and the rotor hub 95 rotate about the longitudinal axis 12.

The stator blades 104 each include a leading edge 105 and a trailing edge 107. The leading edge 105 and the trailing edge 107 of the stator blade 104 define an axial chord as the distance between the leading edge 105 and the trailing edge 107 of the stator blade 104. As the core air flow 92 passes about and around the stator blades 104, the core air flow 92 contacts the leading edge 105, traverses a suction side and a pressure side of the stator blade, e.g., passes by both sides of the stator blade 104, before passing by the trailing edge 107.

Figure 3A:
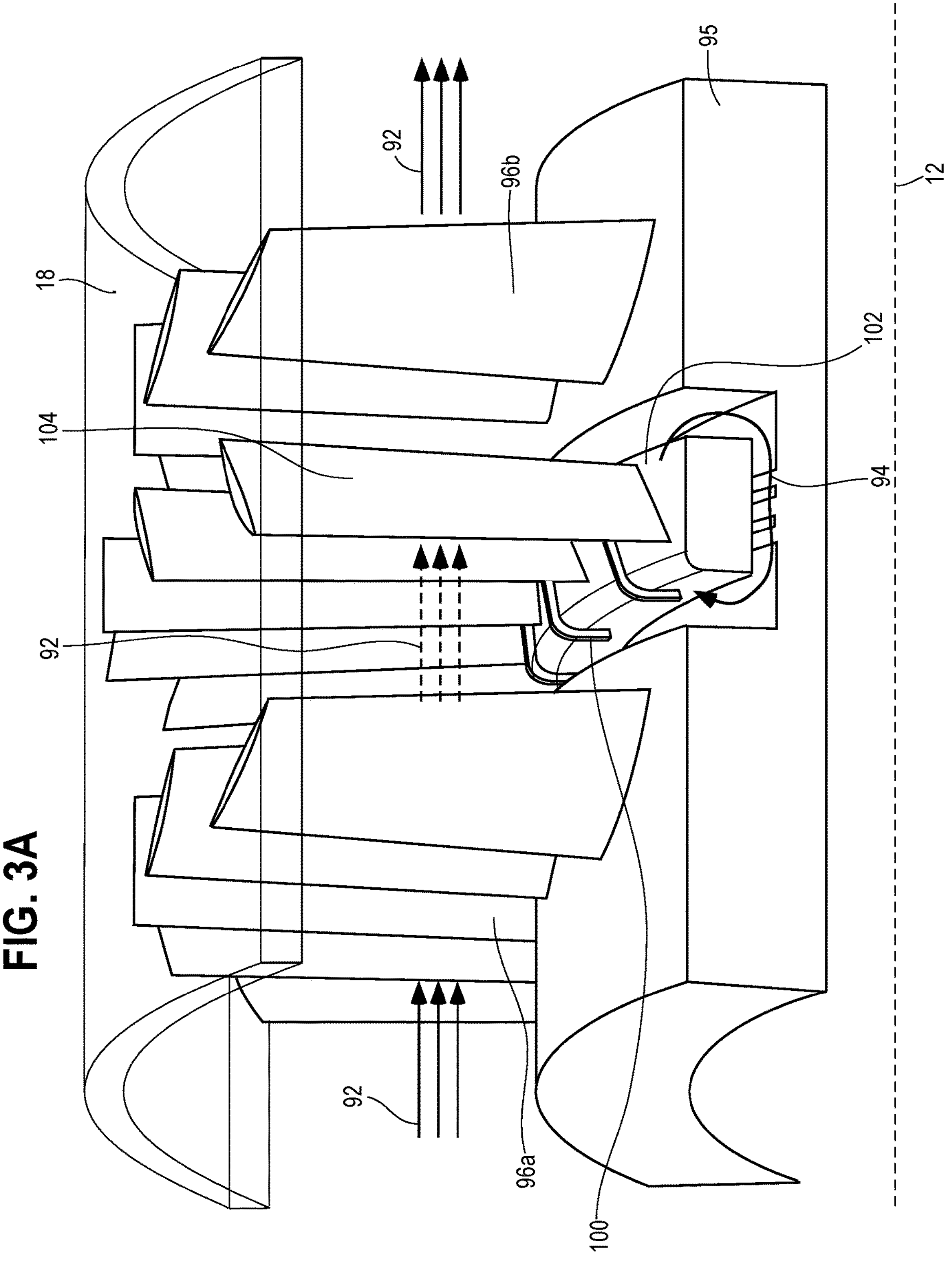
FIG. 3A comprises a side perspective view of a portion of a compressor in accordance with various embodiments of these teachings.
Figure 3B:
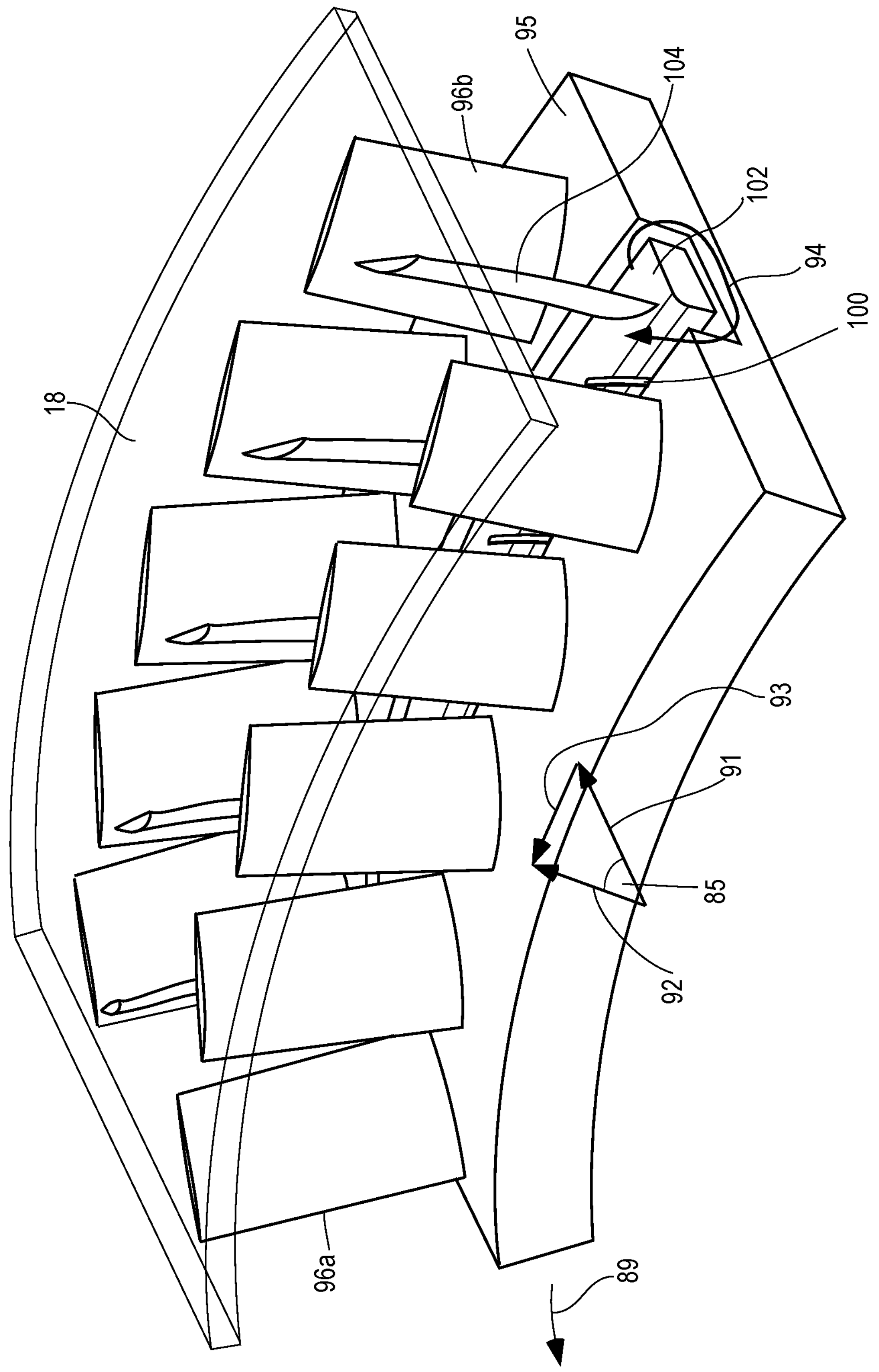
FIG. 3B comprises a top perspective view of a portion of a compressor in accordance with various embodiments of these teachings.
Figure 3C:
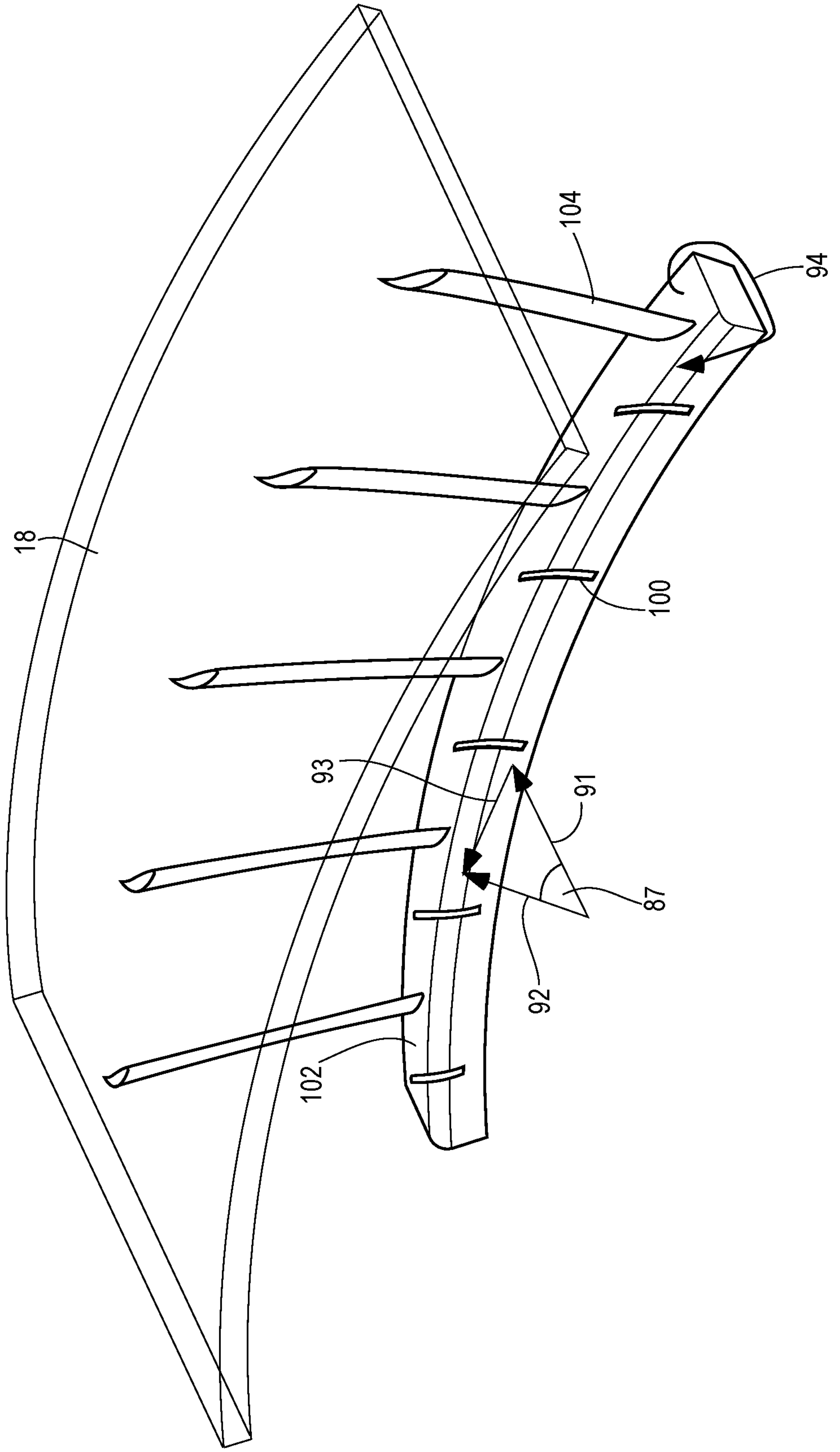
FIG. 3C comprises a top perspective view of a portion of a compressor in accordance with various embodiments of these teachings.
Figure 3D:
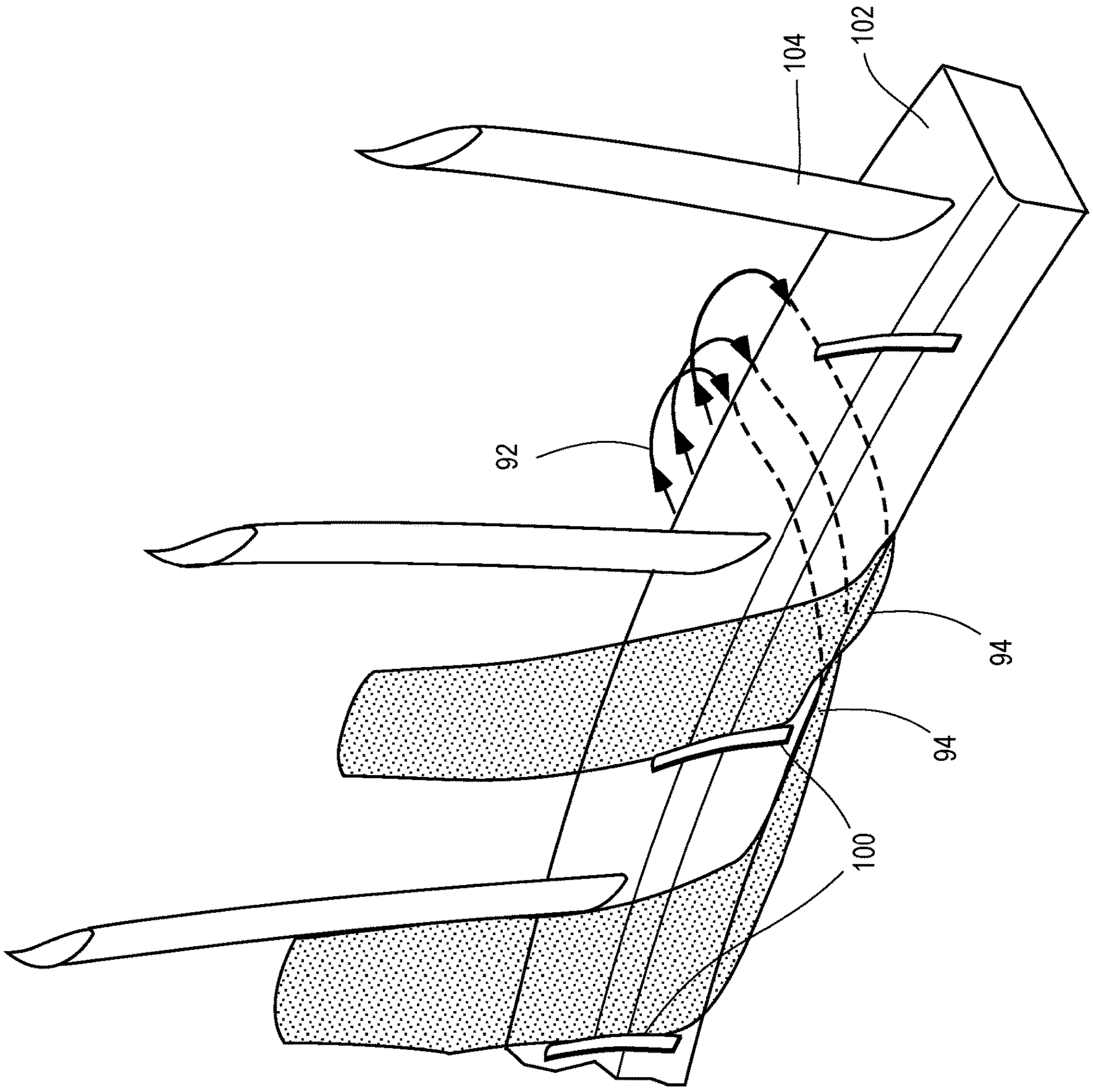
FIG. 3D comprises a top perspective view of a portion of a compressor in accordance with various embodiments of these teachings.
Figure 3E:
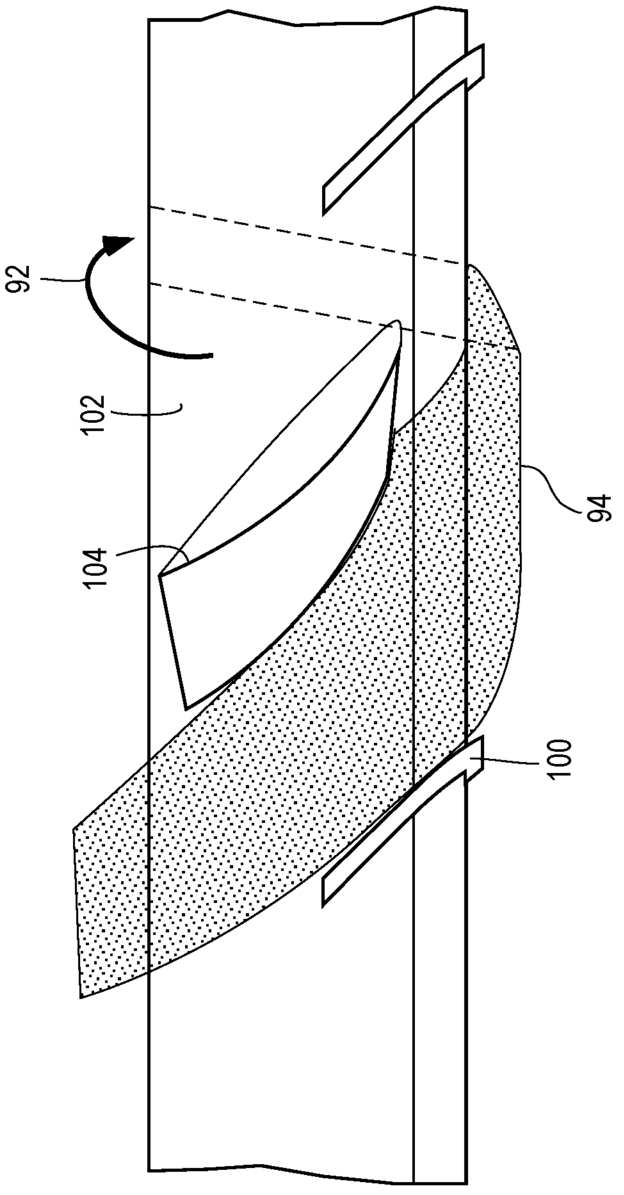
FIG. 3E comprises a top view of a portion of a compressor in accordance with various embodiments of these teachings.
Figure 4:
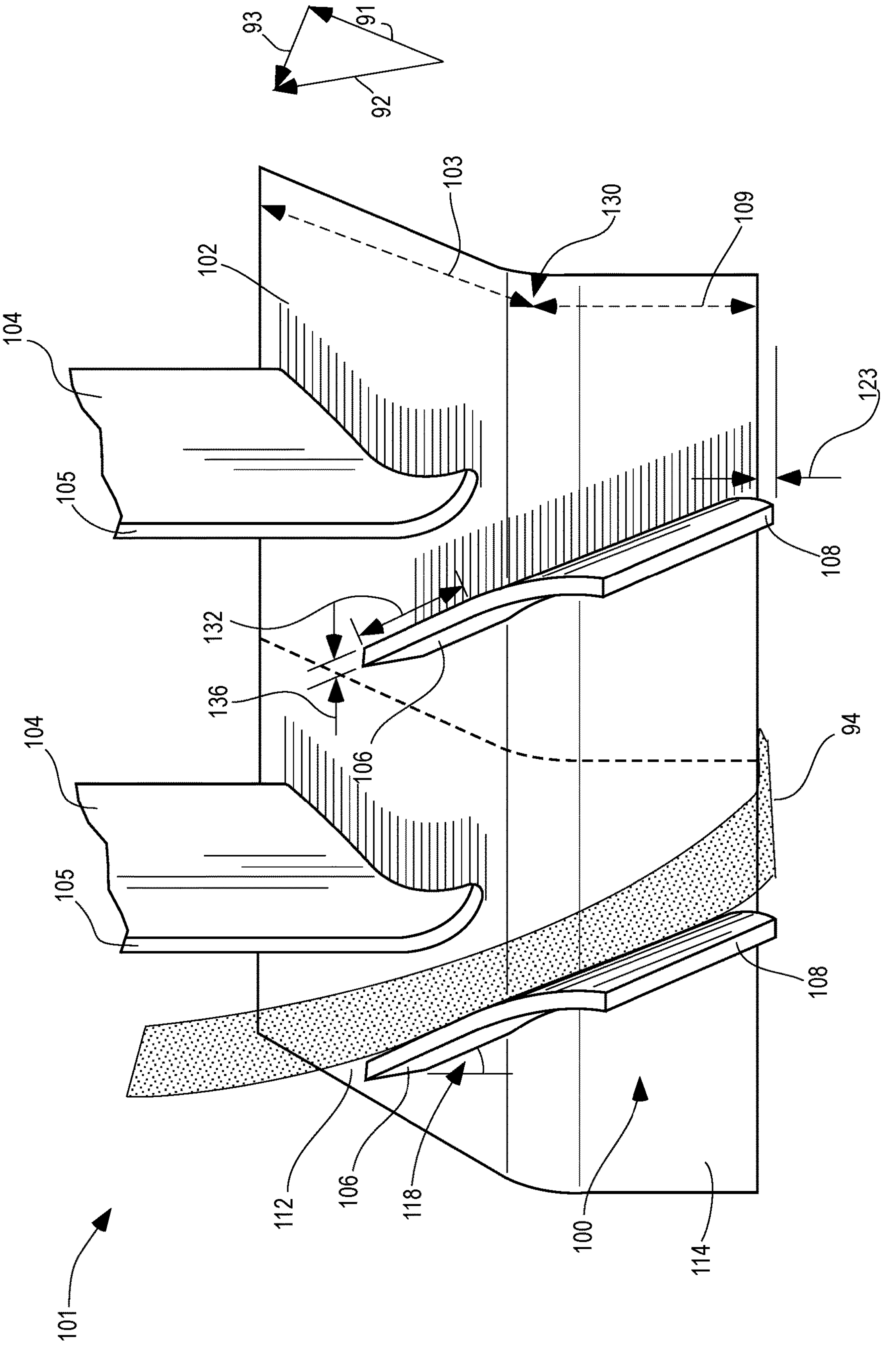
FIG. 4 comprises a diagram as configured in accordance with various embodiments of these teachings.

The core air flow 92 flows along the longitudinal axis 12 through the compressor sections 22 and 24. As the core air flow 92 passes the rotor blade 96*a* and subsequently the stator blade 104, a leakage air flow 94 may be created and/or formed between the trailing edge 107 of the stator blade 104 and the rotor hub 95 and/or the rotor blade 96*b*. The leakage air flow 94 moves in a direction different to the core air flow 92. The leakage air flow 94 may travel from a location downstream, behind, and/or adjacent to the trailing edge 107 of the stator blade 104, along the stator hub 102 in a direction substantially opposite to the core air flow 92, e.g., moving upstream as compared to the direction the core air flow 92 is travelling through the HP compressor section 24, and around to and up into the first axial gap 97, as shown by the corresponding arrow illustrating the leakage air flow 94, contacting the redirection structure 100. The leakage air flow 94, as illustrated in FIGS. 3E and 4, includes a volume of air coming from underneath the stator hub 102, and contacting the redirection structure 100 to redirect, guide, and/or merge the leakage air flow 94 with the core air flow 92. The leakage air flow 94 is created because a portion of the core air flow 92, as it passes the stator blade 104, falls into a gap between the stator hub 102 and the rotor hub 95 near the rotor blade 96*b*. This gap is similar to the axial gap 97 described above. The core air flow 92 is a continuous stream of a volume of air, and as the core air flow 92 continues to pass through the HP compressor section 24 and portions continue to fall into the gap, a leakage air flow 94 is created and begins to move in a direction opposite to the core air flow 92.

As shown in FIGS. 2 and 3A to 3E, the redirection structure 100 acts to redirect the leakage air flow 94 to redirect, guide, and/or merge the leakage air flow 94 with the core air flow 92. As described herein, the merging of the leakage air flow 94 with the core air flow 92 includes redirecting the leakage air flow 94, utilizing the redirection structure 100, in a direction at least partially in the same direction as the core air flow 92. The core air flow 92, as stated above, includes both the axial component 91 and the tangential component 93. In aspects, the redirection, guiding, and/or merging of the leakage air flow 94 with the core air flow 92 occur at an angle substantially parallel to the stator blade 104. In some embodiment, the leakage air flow 94 may be redirected, guided, and/or merged such that at least one vector associated with the leakage air flow 94 pointing in an acute direction as compared to the core air flow 92. By "acute direction" it is meant that the leakage air flow 94 is represented as a vector pointing at an angle less than 90 degrees as compared to the core air flow 92 and in the same direction of the core air flow 92.

As the core air flow 92 moves through the engine, it assumes an angle. The angle of the core air flow 92 is defined by the angle of the core air flow 92 as compared to the longitudinal axis 12. The angle of the core air flow 92 may additionally or alternatively be defined by the magnitude of the tangential component 93 of the core air flow 92 as compared to the axial component 91. The direction of the axial component 91 of the core air flow 92 is substantially parallel to the longitudinal axis 12 and generally maintains this direction. For illustrative purposes only, as one example, the core air flow 92 may enter the HP compressor section at an angle of about 45 degrees with respect to the longitudinal axis 12, e.g., the angle 85 as shown in FIG. 3B. The angle 85 represents the tangential component 93 of the core air flow 92. The core air flow 92 passes through the rotor blade **96*a* and the angle 85 of the core air flow 92 is changed to a second angle 87, as shown in FIG. 3C, of about 65 degrees as compared to the longitudinal axis 12. The change of the angle 85 to the second angle 87 is due to the rotation 89 and associated drag forces and friction caused by the rotor blade 96*a*. The core air flow 92 contacts the stator blade 104 and may pass by, though, and around the stator blade 104 to the rotor blade 96*b* and return to the entering angle, angle 85, of about 45 degrees as compared to the longitudinal axis 12**.

The angle of the core air flow 92 changes as it moves through the engine. The angle changes from the original first value, e.g., the angle 85, as the core air flow 92 enters the HP compressor section 24, to a second value, e.g., the second angle 87, after the core air flow 92 passes the rotor blade **96*a*. The angle of the core air flow 92 then is changed back to the original value, e.g., the angle 85, after the core air flow 92 passes the stator blade 104, and changed back to the second value (or substantially the second value), e.g., the angle 87, after the core air flow 92 passes the rotor blade 96*b*. This changing of the first value to the second value and back to the first value may occur through each stage of the HP compressor section 24. The redirection structures 100 are utilized to redirect guide, and/or conform the direction of flow of the leakage air flow 94 to conform to the direction of flow of the second value or second angle 87 of the core air flow 92, e.g., the 65-degree angle/magnitude of the tangential component 93. In so doing the leakage air flow 94 is merged back (in whole or in part) to the core air flow 92**.

Figure 5:
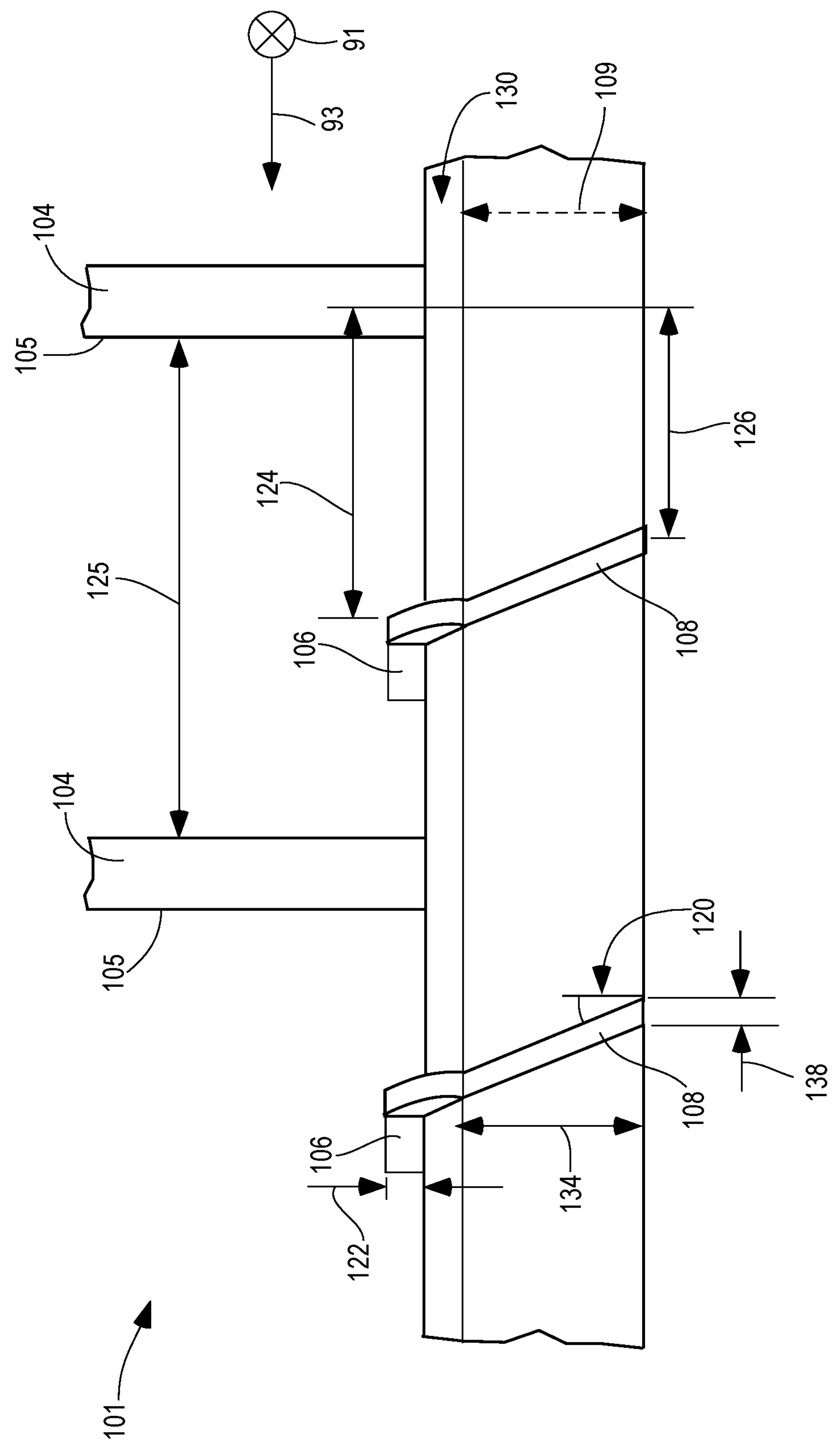
FIG. 5 comprises a diagram as configured in accordance with various embodiments of these teachings.

The redirection structures provided herein can assume various configurations, forms, dimensions, and/or placements. FIGS. 4, 5, 6, 7, and 8 illustrate some different configurations, forms, dimensions, and/or placements of the redirection structure 100. More specifically, FIGS. 4 and 5 show a stator structure including multiple redirection structures associated with adjacent stator blades to redirect a leakage air flow. FIGS. 4 and 5 show redirection structures that are a single piece of material capable of being coupled to a stator hub to provide the advantages described herein.

Figure 6:
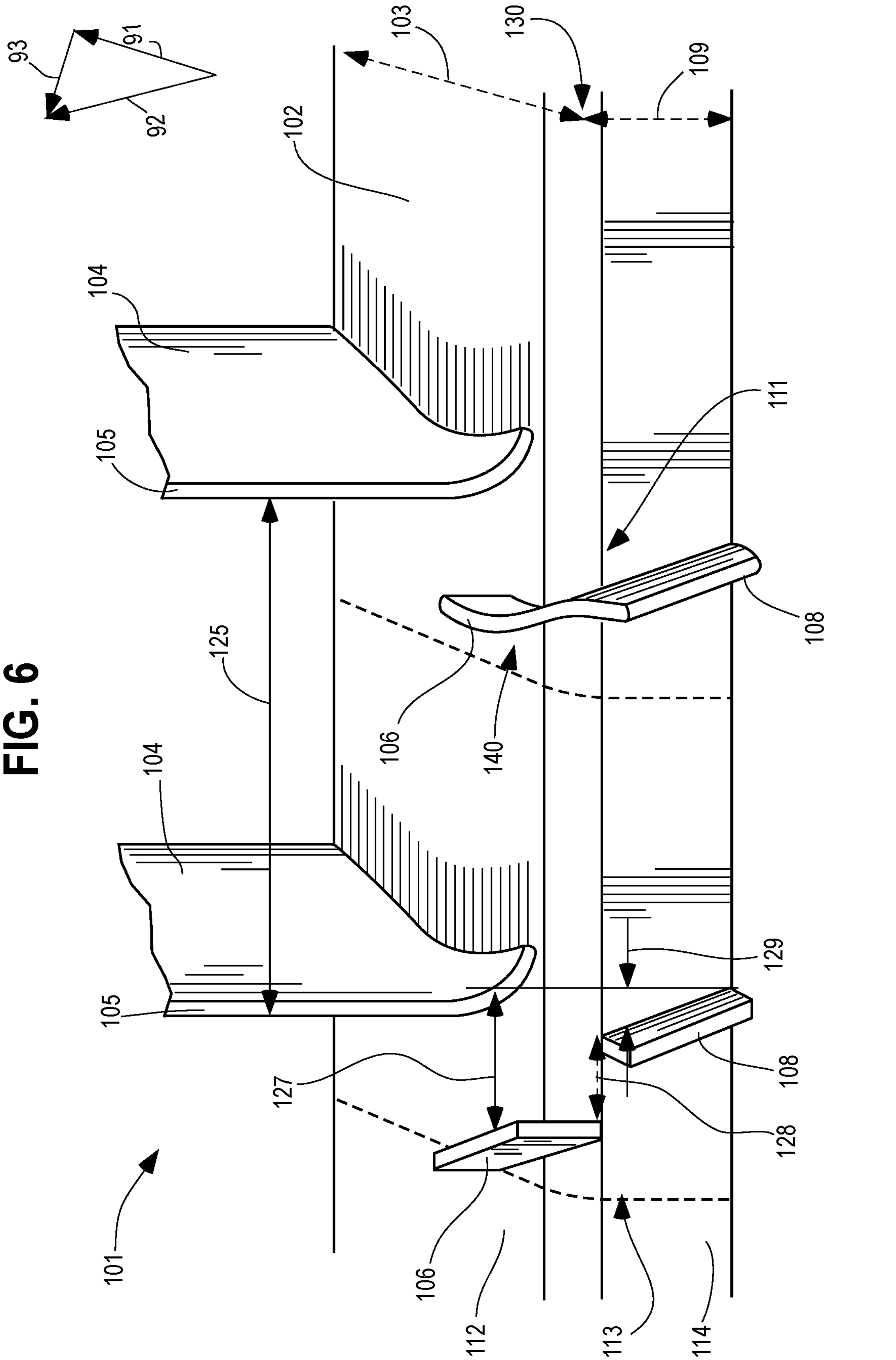
FIG. 6 comprises a diagram as configured in accordance with various embodiments of these teachings.

FIG. 6 shows a stator structure including two differently configured redirection structures, one continuous redirection structure including a camber to redirect a leakage air flow and one non-continuous redirection structure to redirect a leakage air flow. FIG. 6 shows redirection structures that aid in selectively redirecting the leakage air flow to provide the advantages described herein.

Figure 7:
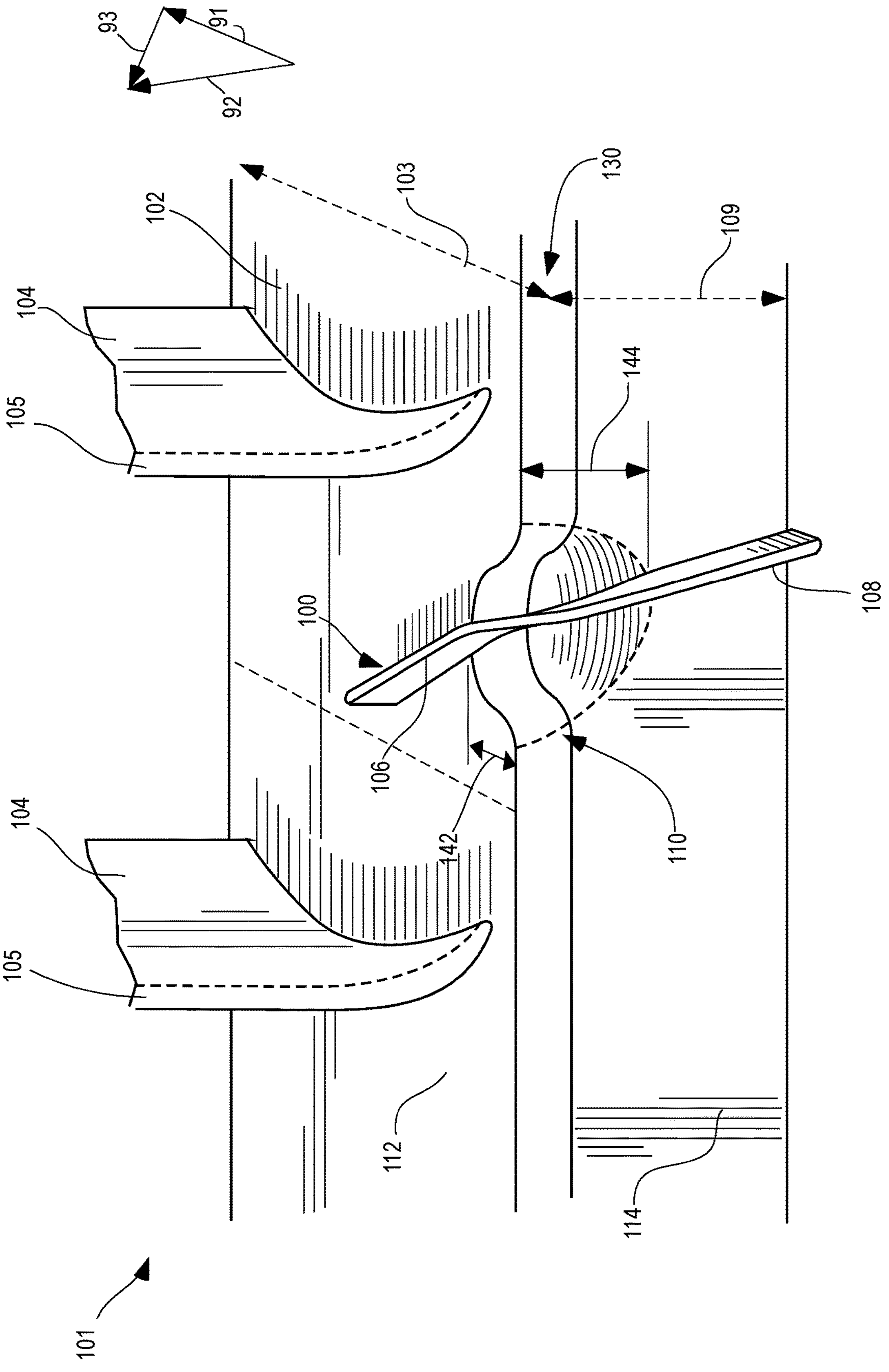
FIG. 7 comprises a diagram as configured in accordance with various embodiments of these teachings.
Figure 8:
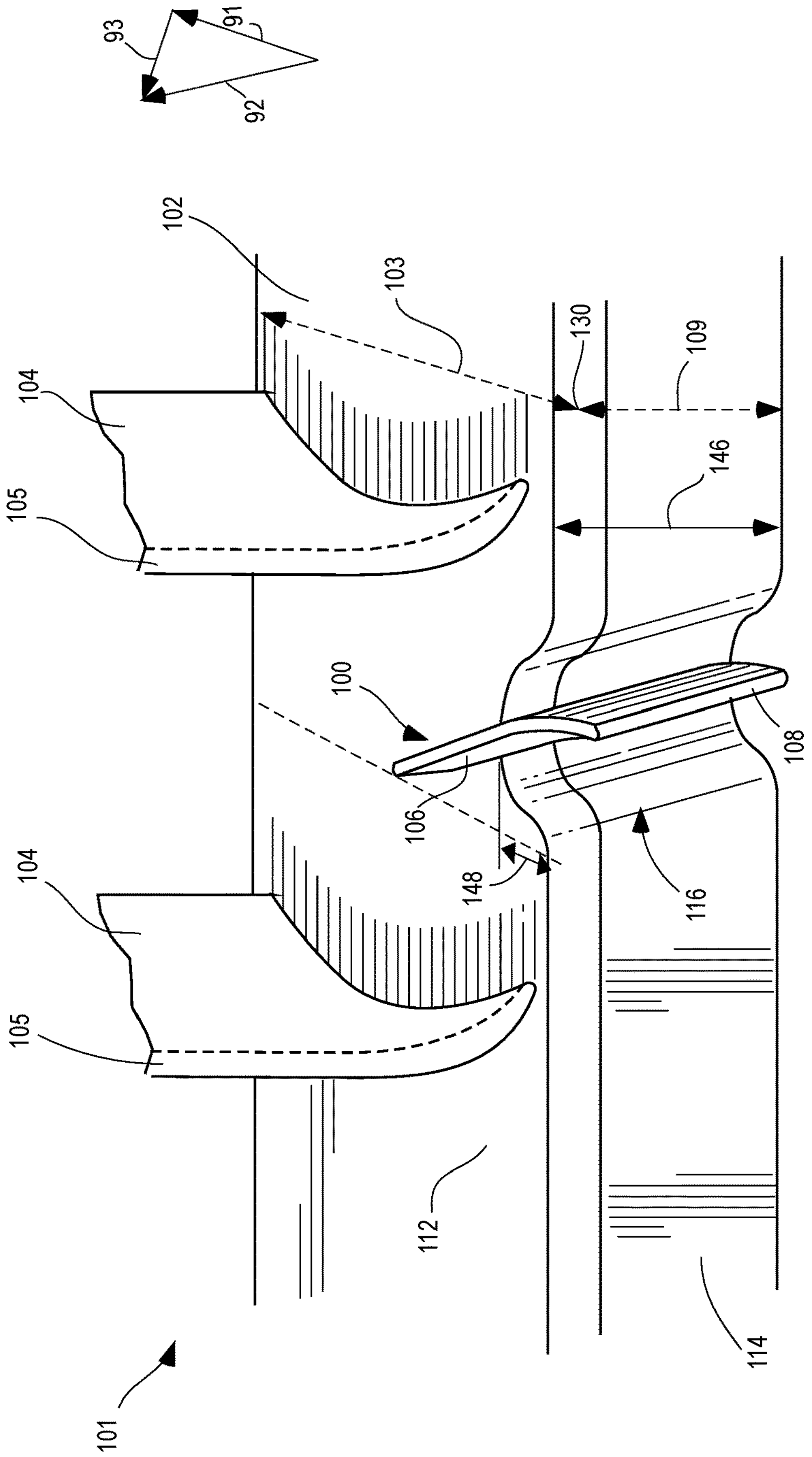
FIG. 8 comprises a diagram as configured in accordance with various embodiments of these teachings.

FIG. 7 shows a stator structure including a recess (with a redirection structure) to limit a risk of contact between the redirection structure and an adjacent rotor blade. Similarly, FIG. 8 shows a stator structure including a recess (with a redirection structure) to limit a risk of contact between the redirection structure and an adjacent rotor blade. These specific redirection structure are now described in detail.

Referring to specifically to FIG. 4, a stator structure 101 including the redirection structure 100 coupled to the stator hub 102 is shown. The redirection structure 100 includes a first portion 106 disposed on a front edge surface 112 of the stator hub 102. The redirection structure 100 further includes a second portion 108 disposed on a facing 114 of the stator hub 102. The front edge surface 112 and the facing 114 meet at a corner 130. The corner 130 may be a rounded corner or may be about 90 degrees (e.g., the front edge surface 112 and the facing 114 being perpendicular to one another). The front edge surface 112 includes a front edge surface length 103. Similarly, the facing 114 includes a facing length 109. The redirection structure is coupled to the stator hub 102. The facing 114, is different than the front edge surface 112.

In aspects, the redirection structure 100 is coupled to the stator hub 102 using a brazing process. The redirection structure 100 may be a piece of metal, such as a piece of steel or other metal capable of being coupled to the stator hub 102 and capable of withstanding the associated forces of the core air flow 92 and the leakage air flow 94 passing about and around the redirection structures 100. In other examples, the redirection structure 100 and the stator hub 102 may be formed together.

In some embodiments, a brazing process may be utilized to attached or dispose the redirection structure 100 onto the stator hub 102, and specifically to the front edge surface 112 and the facing 114. Utilizing a process such as brazing may allow for the redirection structures 100 to be coupled to currently used stator hubs and minimize, reduce, or avoid altogether the potential need for more expensive and/or time-consuming processes, such as machining, additive manufacturing, and/or replacement of the stator hub 102.

In some embodiments, the redirection structure 100 comprises a continuous structure disposed on the front edge surface 112 and the facing 114 which continuously spans the corner 130. In some embodiments, the redirection structure 100 comprises a non-continuous structure with the first portion 106 disposed on the front edge surface 112 and the second portion 108 disposed on the facing 114, including a gap at the corner 130 such that the corner 130 is not spanned. The facing 114 is disposed generally perpendicular to the casing 18, and the front edge surface 112 is disposed generally perpendicular to the facing 114 and generally parallel to the casing 18. The facing 114 may further be defined as being perpendicular or generally perpendicular to the axial component 91 of core air flow 92. The facing 114 may additionally or alternatively extend in the same direction as the stator blades 104, e.g., extending perpendicular to the longitudinal axis 12.

The first portion 106 of the redirection structure 100 is positioned and/or defined with respect to a first stagger angle 118. The first stagger angle 118 may be at an angle substantially parallel to the angle of the leading edge 105 of the stator blade 104. In some embodiments, the first stagger angle 118 may be about 45 degrees different than the angle of the leading edge 105 of the stator blade 104.

The first portion 106 of the redirection structure 100 has a length 132. The length 132 of the first portion 106 may be defined by the length between a terminating end of the first portion 106 and the corner 130. In one illustrative embodiment, the length 132 of the first portion 106 may be about 25% of the axial chord of the stator blade 104 (e.g., the distance between the leading edge 105 and the trailing edge 107 of the stator blade 104). In some embodiments, the length 132 of the first portion 106 may range between from about 5% to 50% of the axial chord of the stator blade 104.

The second portion 108 of the redirection structure 100 has a height 123. The height 123 of the second portion 108 may be defined as the distance the second portion 108 extends out from the facing 114 towards and/or into the axial gaps 97 and 99. In one illustrative embodiment, the height 123 of the second portion 108 may be about 10% of the first axial gap 97 or the second axial gap 99, as described with reference to FIG. 2. In some embodiments, the height 123 of the second portion 108 may range from about 5% to 50% of the first axial gap 97 or the second axial gap 99. The axial gap 97 may be a substantially vertical gap with the facing 114 defining one side of the axial gap 97.

Referring to FIG. 5, the second portion 108 of the redirection structure 100 has a thickness 138, or width. In one illustrative embodiment, the thickness 138 is about half of the height 123. Similarly, in some embodiments, the thickness 138 may range from about 25% to 100% of the height 123.

Referring again to FIG. 5, the first portion 106 of the redirection structure 100 has a height 122. The height 122 may be defined as the distance the first portion 106 extends from the front edge surface 112 towards the casing 18. In one illustrative embodiment, the height 122 of the first portion 106 may be about 5% of the total height of the stator blades 104. In some embodiments, the height 122 of the first portion 106 may range from about 1% to about 20% of the total height of the stator blades 104.

Referring to FIG. 4, the first portion 106 of the redirection structure 100 has a thickness 136, or width. In one illustrative embodiment, the thickness 136 is as about half of the height 122. Similarly, in some embodiments, the thickness 136 may range from about 25% to about 100% of the height 122.

Referring again to FIG. 5, the second portion 108 of the redirection structure 100 is positioned and/or defined with respect to a second stagger angle 120. The second stagger angle 120, similar to the first stagger angle 118, may be an angle substantially parallel to the angle of the leading edge 105 of the stator blade 104. In some embodiments, the second stagger angle 120 may be about 45 degrees different than the angle of the leading edge 105 of the stator blade 104.

The second portion 108 of the redirection structure 100 has a length 134. The length 134 of the second portion 108 may be defined by the length between a terminating end of the second portion 108 and the corner 130. In one illustrative embodiment, the length 134 of the second portion 108 may be about 50% of the facing length 109. In some embodiments, the length 134 of the second portion 108 may range from about 5% to about 100% of the facing length 109.

The first portion 106 has a first tangential location 124 compared to the distance 125 between stator blades. The second portion 108 also has a second tangential location 126 compared to the distance 125 between stator blades. The first tangential location 124 and the second tangential location 126 may be different or the same as compared to one another. In one illustrative embodiment, the first tangential location 124 is about 50% of the distance 125 between stator blades, and the second tangential location 126 is about 25% of the distance 125 between stator blades. The first tangential location 124 and the second tangential location 126 may range from about 5% to about 95% of the distance 125 between stator blades.

Different redirection structures can be used on the same stator hub. For example, and now referring to FIG. 6, the redirection structures 100 illustrated include a continuous redirection structure 111 (e.g., the redirection structure 100 on the right of FIG. 6) and a non-continuous redirection structure 113 (e.g., the redirection structure 100 on the left of FIG. 6). As described above, the stator hub 102 includes the front edge surface 112 including the front edge surface length 103, additionally the stator hub 102 includes the facing 114 having the facing length 109. The front edge surface 112 and facing 114 meet at the corner 130. The continuous redirection structure 111 spans the corner 130. The non-continuous redirection structure 113 does not span the corner 130.

The non-continuous redirection structure 113 alternatively has a stagger distance 128 between the first portion 106 and the second portion 108 of the non-continuous redirection structure 113. In one illustrative embodiment, the stagger distance 128 is about 200% the height 122, the height 123, the thickness 136, or the thickness 138 of the redirection structure 100. In some embodiments, the stagger distance 128 may range from about 100% to about 300% of the height 122, the height 123, the thickness 136, or the thickness 138 of the redirection structure 100. In yet further embodiments, the stagger distance 128 may be zero, such that the first portion 106 and the second portion 108 do not span the corner 130, such that a gap is created at the corner 130, but the first portion 106 and the second portion 108 but are substantially aligned with one another. As illustrated in FIG. 6, the continuous redirection structure 111 may further include a camber 140 of at least a portion of the continuous redirection structure 111. The camber 140 may further aid in redirecting the leakage air flow 94 into the core air flow 92.

In some embodiments, the non-continuous redirection structure 113 may be defined or placed at a first tangential distance 127 and a second tangential distance 129, similar to that described above with reference to FIG. 5, with the difference between the first tangential distance 127 and the second tangential distance 129 defining the stagger distance 128. The first tangential distance of the non-continuous redirection structure 113 is the distance from the stator blade 104 to the first portion 106 of the non-continuous redirection structure 113. The second tangential distance 129 of the non-continuous redirection structure 113 is the distance from the stator blade 104 to the second portion 108 of the non-continuous redirection structure 113. The first tangential distance 127 and the second tangential distance 129 may be different or the same as compared to one another. In one illustrative embodiment, the first tangential distance 127 is about 50% of the distance 125 between stator blades, and the second tangential distance 129 is about 25% of the distance 125 between stator blades. The first tangential distance 127 and the second tangential distance 129 may range from about 5% to about 95% of the distance 125 between stator blades. In embodiments where the first tangential distance 127 and the second tangential distance 129 are the same, the stagger distance 128 is zero.

Referring now to FIG. 7, a recess 110 is illustrated. The recess 110 may be formed or gouged out of the stator hub 102 (e.g., by an appropriate tool and/or process). In some embodiments, the recess 110 may be formed about the corner 130 where the front edge surface 112 and the facing 114 meet. The recess 110 has a recess depth 142 and a recess length 144 measured from the corner 130. In one illustrative embodiment, the recess depth 142 is the same as the height 123 of the second portion 108 of the redirection structure 100. In some embodiments, the recess depth 142 may range from about 5% to about 50% of the first axial gap 97 or the second axial gap 99. In one illustrative embodiment, the recess length 144 is about half of the facing length 109. In some embodiments, the recess length 144 may range from about 5% to about 100% of the facing length 109.

Referring now to FIG. 8, the recess 116 may be formed or gouged out of the facing 114. In this configuration, the recess 116 has a recess length 146 measured from the corner 130. In one illustrative embodiment, the recess length 146 is the same length as the facing length 109. In some embodiments, the recess length 146 may range from about 5% to about 100% of the facing length 109. The recess 116 further has a recess depth 148 measured from the corner 130. In one illustrative embodiment, the recess depth 148 is the same depth as the height 123 of the second portion 108. In some embodiments, the recess depth 148 may range from about 5% to about 50% of the first axial gap 97 or the second axial gap 99.

The redirection structure 100 may protrude into the axial gaps 97 and 99. The redirection structures 100 may be shaped, sized, and/or angled in such a way to reduce risks of contact between, for example, the rotor blade 96*a* and the second portion 108 of the redirection structure 100. The recesses 110 and 116 may allow for the redirection structure 100 to be utilized while potentially further decreasing the risk of contact between, for example, the rotor blade 96*a* and the second portion 108 of the redirection structure 100. By gouging out the stator hub 102 to form the recesses 110 and 116 to place the redirection structure 100 at least partially therein, the distance the redirection structure 100 protrudes into the first axial gap 97 and the second axial gap 99 is reduced, and thus may reduce the chance of contacting the rotor blades 96*a* and 96*b*.

The redirection structures described herein provide some advantages when used with aircraft engines. Some of these advantages are described below.

In use, the redirection structure 100, by redirecting the leakage air flow 94 in a direction as least partially non-perpendicular and/or against the core air flow 92 to merge with the core air flow 92, provides increased efficiency for the operation of the aircraft engine. The leakage air flow 94 being directed to be non-opposed to the core air flow 92 during merging allows the core air flow 92 to pass through the compressor sections 22 and 24 more efficiently. More specifically, redirecting and merging the leakage air flow 94 in a direction at least partially in the same direction as the core air flow 92 reduces the mixing losses, e.g., the losses occurring when two streams of air flow in different directions, as described herein, the core air flow 92 and leakage air flow 94 may mix to form a new combined direction, thus providing an increase in efficiency.

Premature separation refers to when the core air flow 92 near the junction between a side or surface of the stator blade 104 and the front edge surface 112 is retarded by a friction force of the two surfaces leading to the core air flow 92 having zero or negative velocity. The junction between a side of surface of the stator blade 104 and the front edge surface 112 may include a suction surface or a pressure surface of the stator blade 104 and the front edge surface. The frictional force may be a frictional viscous force. The friction force of the two surfaces leading to the core air flow 92 having zero or negative velocity may act to stop the flow or reverse the flow creating excess loses.

Advantageously, the redirection structure 100 aids in avoiding premature separation of the core air flow 92 through the compressor sections 22 and 24. Premature separation is avoided because leakage air flow 94 is redirected by redirection structure 100 to be in a direction non-opposed to the core air flow 92, as discussed herein. This is advantageous because significant excess losses will reduce efficiency of the aircraft engine drastically, and in some cases may lead to compressor stall, where core air flow 92 can no longer move downstream substantially parallel to the longitudinal axis 12.

By further redirecting the leakage air flow 94 utilizing the redirection structure 100, the leakage air flow 94 is redirected along the leading edge 105 of the stator blade 104. The leakage air flow 94 may be redirected in a direction at least partially away from the suction side of the leading edge 105 as compared to hubs and blades not utilizing the redirection structure 100.

Leading edge incidence, also referred to as the leading edge incidence angle, relates to the differences between the angle of core air flow 92 and the angle of leading edge 105 of the stator blade 104. For example, as discussed above with reference to FIGS. 3B and 3C, the core air flow 92 may pass by the rotor blades 96*a* and 96*b* at the first angle 85. The angle of the core air flow 92 may be changed to the second angle 87. The leading edge incidence angle refers to the difference between the second angle 87 of the core air flow 92 and the angle of the leading edge 105 of the stator blade 104.

The redirection structures 100 allow for the leading edge incidence angle to be protected and/or maintained, e.g., to minimize any potential shifting and or moving of the core air flow 92 to a direction substantially different from, or perpendicular, to the stagger angle of leading edge 105 of the stator blade 104. This is advantageous because at high leading edge incidence angles, the risk of flow separation and compressor stall are high as the core air flow 92 flows is in a direction substantially perpendicular, instead of parallel, to the longitudinal axis 12.

Various parameters such as local solidity can describe the blades used in engines. In some embodiments, the redirection structure 100 may be shaped, sized, and/or angled in such a way to redirect the leakage air flow 94 into a direction at least partially parallel the core air flow 92 when the leakage air flow 94 merges with the core air flow 92. This may additionally or alternatively increase and/or improve the local solidity of the stator blade 104, and more specifically, the leading edge 105 of the stator blade 104. By utilizing the redirection structure 100, the stator structure 101 now includes more surface area to redirect and/or guide the core air flow 92 and the leakage air flow 94, either separately or after the two air flows are mixed thereby increasing the local solidity. This is advantageous because increased local solidity can provide loading relief to the stator leading edge 105.

The redirection structure 100 may additionally or alternatively provide the leading edge 105 of the stator blade 104 with loading relief. This may be done by increasing the local solidity of the leading edge 105. Increasing the local solidity, as discussed above, may be accomplished by protecting the leading-edge incidence and/or guiding or redirecting the leakage air flow 94 parallel to the core air flow 92. Loading relief generally refers to assisting the force, or load, imparted by the stator blade 104 onto the merged flow of core air flow 92 and leakage air flow 94. This guides or changes the merged flow from second flow angle 87 at stator leading edge 105 to first flow angle 85 at stator trailing edge 107 as it moves downstream along the longitudinal axis 12. The force, or load used to cause the loading relief is imparted by the redirection structure 100 onto leakage air flow 94. Providing loading relief is advantageous because more force can be imparted onto merged core air flow 92 and leakage air flow 94, thus increasing efficiency.

Further aspects of the disclosure are provided by the subject matter of the following clauses:

A stator structure comprising: a casing centered about a longitudinal axis of a turbine engine; a plurality of stator blades coupled to and extending inward from the casing towards the longitudinal axis; and a stator hub disposed within the casing, centered about the longitudinal axis, and coupled to the plurality of stator blades, the stator hub including a facing that is disposed generally perpendicular to the casing and a front edge surface disposed generally perpendicular to the facing, the stator hub including a redirection structure including a first portion and a second portion, the first portion disposed on the front edge surface of the stator hub and the second portion disposed on the facing of the stator hub, wherein a core air flow moves along the longitudinal axis and past the plurality of stator blades, and a leakage air flow moves in a direction different to the core air flow; wherein the redirection structure is effective to redirect the leakage air flow to merge into the core air flow.

The structure of any preceding clause wherein the first portion and the second portion of the redirection structure includes a single continuous structure disposed on the front edge surface and the facing of the stator hub.

The structure of any preceding clause wherein the redirection structure has a continuous height on the front edge surface and the facing of the stator hub.

The structure of any preceding clause wherein the redirection structure has a continuous length on the front edge surface and the facing of the stator hub.

The structure of any preceding clause wherein the redirection structure includes a non-continuous structure with the first portion disposed on the front edge surface of the stator hub and the second portion disposed on the facing of the stator hub.

The structure of any preceding clause wherein the stator hub includes a recess and at least a portion of the redirection structure is disposed within the recess.

The structure of any preceding clause wherein the recess includes a depth of about 10% of an axial gap between the plurality of stator blades and adjacent rotor blades.

The structure of any preceding clause wherein the recess includes a length of about 50% of a length of the facing.

The structure of any preceding clause wherein the redirection structure is brazed onto the stator hub.

The structure of any preceding clause wherein at least a portion of the redirection structure is placed along a leading edge of the plurality of stator blades.

The structure of any preceding clause wherein the first portion and the second portion of the redirection structure includes a height of about 5% of a total height of the plurality of stator blades.

The structure of any preceding clause wherein the first portion of the redirection structure includes a front surface length of about 25% of an axial chord of the plurality of stator blades.

The structure of any preceding clause wherein the second portion of the redirection structure includes a length of about 50% of a length of the facing of the stator hub.

The structure of any preceding clause wherein at least a portion of the redirection structure is parallel to a leading edge of the plurality of stator blades.

A turbine engine including: at least one compressor section including a stator structure disposed in the at least one compressor section, wherein the stator structure includes a casing centered about a longitudinal axis, a plurality of stator blades coupled to and extending inward from the casing towards the longitudinal axis, and a stator hub disposed within the casing, centered about the longitudinal axis, and coupled to the plurality of stator blades, the stator hub including a facing that is disposed generally perpendicular to the casing and a front edge surface disposed generally perpendicular to the facing, the stator hub including a redirection structure including a first portion and a second portion, the first portion disposed on the front edge surface of the stator hub and the second portion disposed on the facing of the stator hub; a combustion section centered about the longitudinal axis and positioned adjacent to the at least one compressor section; and a turbine section centered about the longitudinal axis and positioned adjacent to the combustion section; wherein a core air flow moves along the longitudinal axis, into the at least one compressor section, past the plurality of stator blades, into and through the combustion section, and into and through the turbine section and a leakage air flow from the core air flow in the at least one compressor section that moves in a direction different from the core air flow in the at least one compressor section, and wherein the redirection structure is effective to redirect the leakage air flow from the stator structure to merge into the core air flow.

The turbine engine of any preceding clause wherein the first portion and the second portion of the redirection structure includes a single continuous structure disposed on the front edge surface and the facing of the stator hub.

The turbine engine of any preceding clause wherein the redirection structure includes a non-continuous structure with the first portion disposed on the front edge surface of the stator hub and the second portion disposed on the facing of the stator hub.

The turbine engine of any preceding clause wherein the stator hub includes a recess and the redirection structure is disposed within the recess.

The turbine engine of any preceding clause wherein the redirection structure is brazed onto the stator hub.

The turbine engine of any preceding clause wherein at least a portion of the redirection structure is placed along a leading edge of the plurality of stator blades.

The structure of any preceding clause wherein the stator structure is incorporated in a turbine engine.

The structure of any preceding clause wherein the turbine engine is deployed on an aircraft.

The structure of any preceding clause wherein the turbine engine comprises the compressor section, a combustion section, and a turbine section.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosed concept.

What is claimed is:

1. A stator structure comprising:

a casing centered about a longitudinal axis of a turbine engine;

a plurality of stator blades coupled to and extending inward from the casing towards the longitudinal axis; and a stator hub disposed within the casing, centered about the longitudinal axis, and coupled to the plurality of stator blades, the stator hub including a facing that is disposed generally perpendicular to the casing and a front edge surface disposed generally perpendicular to the facing, the stator hub including a redirection structure including a first portion and a second portion, the first portion disposed on the front edge surface of the stator hub and extending upward from the front edge surface, and the second portion disposed on the facing of the stator hub and extending outward from the facing and into an axial gap between the plurality of stator blades and adjacent rotor blades, wherein a core air flow moves along the longitudinal axis at an entering angle and past the plurality of stator blades, and a leakage air flow moves in a direction different to the core air flow;

wherein at least a portion of the redirection structure is disposed along and extends past a leading edge of the plurality of stator blades, and wherein the redirection structure is configured to redirect and conform the leakage air flow to merge into the core air flow at substantially the entering angle.

2. The stator structure of claim 1, wherein the first portion and the second portion of the redirection structure comprises a single continuous structure disposed on the front edge surface and the facing of the stator hub.

3. The stator structure of claim 2, wherein the redirection structure has a continuous height on the front edge surface and the facing of the stator hub.

4. The stator structure of claim 2, wherein the redirection structure has a continuous length on the front edge surface and the facing of the stator hub.

5. The stator structure of claim 1, wherein the redirection structure comprises a non-continuous structure with the first portion disposed on the front edge surface of the stator hub and the second portion disposed on the facing of the stator hub.

6. The stator structure of claim 1, wherein the stator hub includes a recess and at least a second portion of the redirection structure is disposed within the recess.

7. The stator structure of claim 6, wherein the recess includes a depth of about 10% of the axial gap between the plurality of stator blades and adjacent rotor blades.

8. The stator structure of claim 6, wherein the recess includes a length of about 50% of a length of the facing.

9. The stator structure of claim 1, wherein the redirection structure is brazed onto the stator hub.

10. The stator structure of claim 1, wherein the first portion and the second portion of the redirection structure includes a height of about 5% of a total height of the plurality of stator blades.

11. The stator structure of claim 1, wherein the first portion of the redirection structure includes a front surface length of about 25% of an axial chord of the plurality of stator blades.

12. The stator structure of claim 1, wherein the second portion of the redirection structure includes a length of about 50% of a length of the facing of the stator hub.

13. The stator structure of claim 1, wherein the at least a portion of the redirection structure is parallel to the leading edge of the plurality of stator blades.

14. A turbine engine, comprising:

at least one compressor section including a stator structure disposed in the at least one compressor section, wherein the stator structure includes a casing centered about a longitudinal axis, a plurality of stator blades coupled to and extending inward from the casing towards the longitudinal axis, and a stator hub disposed within the casing, centered about the longitudinal axis, and coupled to the plurality of stator blades, the stator hub including a facing that is disposed generally perpendicular to the casing and a front edge surface disposed generally perpendicular to the facing, the stator hub including a redirection structure including a first portion and a second portion, the first portion disposed on the front edge surface of the stator hub and extending upward from the front edge surface, and the second portion disposed on the facing of the stator hub and extending outward from the facing and into an axial gap between the plurality of stator blades and adjacent rotor blades;

a combustion section centered about the longitudinal axis and positioned adjacent to the at least one compressor section; and a turbine section centered about the longitudinal axis and positioned adjacent to the combustion section;

wherein a core air flow moves along the longitudinal axis, into the at least one compressor section at an entering angle, past the plurality of stator blades, into and through the combustion section, and into and through the turbine section and a leakage air flow from the core air flow in the at least one compressor section that moves in a direction different from the core air flow in the at least one compressor section, and wherein at least a portion of the redirection structure is disposed along and extends past a leading edge of the plurality of stator blades, and wherein the redirection structure is configured to redirect and conform the leakage air flow from the stator structure to merge into the core air flow at substantially the entering angle.

15. The turbine engine of claim 14, wherein the first portion and the second portion of the redirection structure comprises a single continuous structure disposed on the front edge surface and the facing of the stator hub.

16. The turbine engine of claim 14, wherein the redirection structure comprises a non-continuous structure with the first portion disposed on the front edge surface of the stator hub and the second portion disposed on the facing of the stator hub.

17. The turbine engine of claim 14, wherein the stator hub includes a recess and the redirection structure is disposed within the recess.

18. The turbine engine of claim 14, wherein the redirection structure is brazed onto the stator hub.

19. The turbine engine of claim 14, wherein the at least a portion of the redirection structure is parallel to the leading edge of the plurality of stator blades.

* * * * *